Jan. 13, 1953  O. W. MAHLKE  2,625,451
NONMAGNETIC BRAKE PIVOT
Filed Aug. 25, 1947

Inventor
Oscar W. Mahlke
By Clarence A. O'Brien
and Harvey B. Jacobson
Attorneys Patented Jan. 13, 1953

2,625,451

UNITED STATES PATENT OFFICE 2,625,451

NONMAGNETIC BRAKE PIVOT

Oscar W. Mahlke, Washington, D. C.

Application August 25, 1947, Serial No. 770,515

4 Claims. (Cl. 308—237)

This invention relates to novel and useful improvements in pivot pins, particularly those utilized in conjunction with electrically actuated apparatus such as elevator brakes.

An object of this invention is to impede the flow of magnetic forces from a remote source of electrical energy to the pivot pin.

Another purpose of this invention is to provide a ferrous pin for requisite strength having a non-ferrous sleeve thereon for impeding the transmission of magnetic forces to said ferrous pin.

Another purpose of this invention is to provide an extremely simple and inexpensive device of the nature to be described which when utilized in conjunction with electrically actuated elevator brake mechanism, reduces the tendencies of galling and freezing.

Another aim of the invention is to provide a steel pivot pin having the requisite strength but having an improved bearing surface for longer life in steel journals.

Another purpose of this invention is to provide means for carrying out the above mentioned functions.

Other objects and features of novelty will become apparent to those skilled in the art, in following the description of the preferred form of the present invention, illustrated in the accompanying drawing, wherein.

Referring now in detail to the illustrated preferred embodiment of the present invention, like reference characters are used throughout to indicate similar elements thereof.

Figure 1:
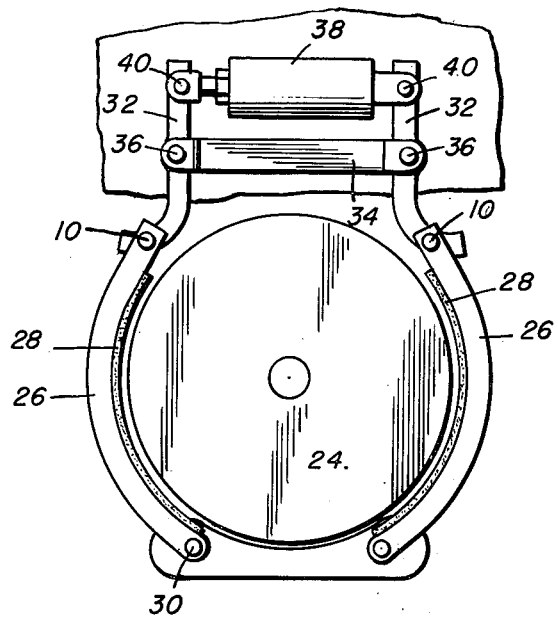
Figure 1 is an elevational view of a portion of an elevator brake shoe actuation mechanism, showing an environment for use of the present invention.

This invention has been conceived and developed to provide a device for inhibiting galling, freezing and other detrimental conditions of wear which tend to destroy the efficiency of pivot pins normally associated with electrically actuated mechanical moving apparatus. The preferred environment for use of the present invention is in conjunction with elevator brake mechanism which is generally solenoid operated. The electro-magnetic forces developed in conjunction with such actuation are transmitted through various linkages and in the normal operation of the device, pivot pins which are usually of steel, turning in steel journals, become galled primarily due to rubbing of the bearing surfaces of the magnetically attracted pin and its journals.

The gist of the present invention therefore resides in teaching a novel and useful method of applying a non-ferrous, relatively non-magnetic, sleeve or cover on a ferrous, relatively magnetic, shank thereby providing an improved brake pin which constitutes a replacement for the present unsatisfactory pins now in use.

A pin or shank 10 is provided of a metallic substance preferably iron or steel, and a recess or reduced portion 12 is provided in the peripheral surface thereof. Slots 14 and 16 extend through the shank for the purpose of receiving stop pins therein, when the invention is utilized in conjunction with elevator brake apparatus. Of course, the usual locking apertures 18 may be supplied at the terminal portions of the shank for turning the same for machining while the centering apertures 20 are employed for rotatably supporting the pin between the centers of a conventional lathe.

It will be understood of course that the above mentioned apertures are provided merely for the purpose of expediency in manufacture. The recess 12 may be turned in the surface of the said pin 10 through the medium of a conventional lathe wherein the said apertures 18 and 20 are utilized. Then a non-ferrous substance 22 may be welded, blown or otherwise intimately bonded and applied to the recess 12. This forms a sleeve, which may satisfactorily be as thin as ten thousandths of an inch thick, on the shank 10 and it will be noted that the said sleeve does not extend to the terminal of the said shank.

Of course, after the non-ferrous substance is fixed in the recess 12, the resulting pin may then be again turned in a lathe or otherwise polished to the final desired diameter. Since the non-ferrous sleeve 22 is provided of such materials as bronze, brass or the like magnetic forces are impeded from permeating the same and magnetizing the pin. Thus, the magnetic attraction of such a pin is reduced to such an extent as to be substantially unaffected thereby in utility of the device with magnetically actuated mechanism such as found in elevator brake shoe apparatus.

It should be observed that the bronze bearing sleeve on the pin will cooperate with the steel bearing surfaces of the various journals in the brake shoe and associated structure without danger of galling or freezing.

Figure 2:
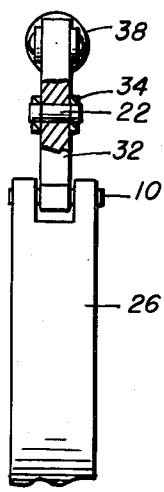
Figure 2 is an elevational view of a portion of the device shown in Figure 1, portions being shown in section to illustrate the mounting of the improved pin.
Figure 3:
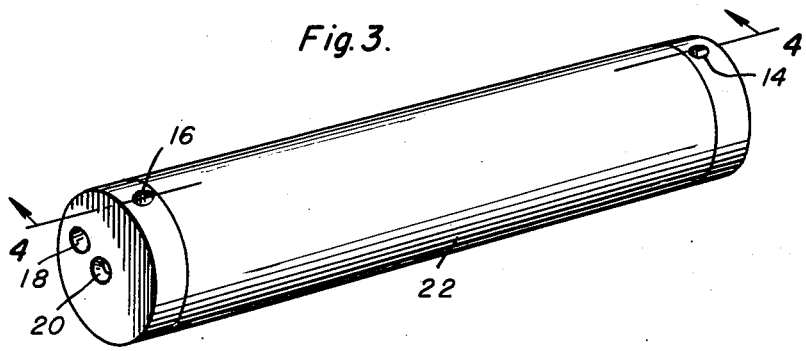
Figure 3 is a perspective view of the preferred form of the invention.
Figure 4:
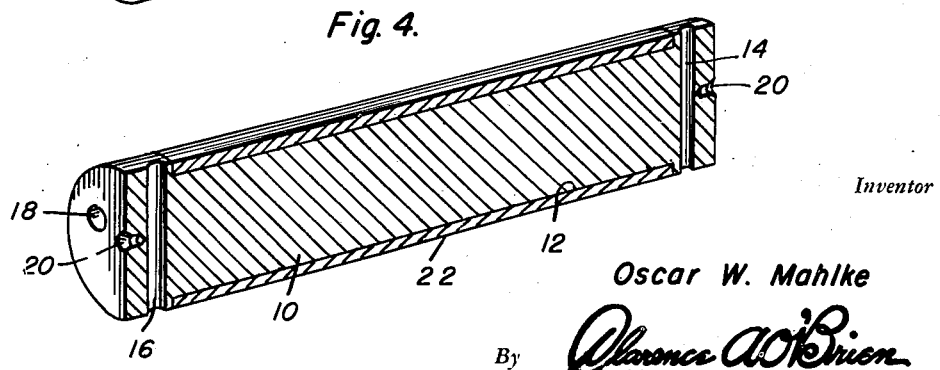
Figure 4 is a longitudinal sectional view of the invention shown in Figure 3 and taken substantially on the line 4—4 thereof and in the direction of the arrows.

A suitable environment for use of the invention is shown in Figure 1, consisting of an elevator brake assembly of a conventional design, comprising a brake drum 24 selectively engaged by arcuate brake shoes 26 having brake linings 28. The shoes are hinged at one end at 30 to fulcrum pins and at their other extremities are engaged by actuating a brake actuator such as the electric solenoid 38 has its extremities pivoted at 40 to the levers 32. As shown in Figures 1 and 2, the lever is journaled between ears or lugs in the extremities of the members of solenoid 38, fulcrum 34 and brake shoes 26 and the pivot pins 10, 36 and 40 may each be of the construction set forth in Figures 3 and 4.

Due to the extreme simplicity achieved by the invention a further description thereof is deemed unnecessary. However, variations may be made herein without departing from the spirit of the invention and accordingly, limitation is sought only in accordance with the scope of the following claims.

Having described the invention, what is claimed as new is:

1. In an electrically operated brake mechanism for elevators, a replacement pivot pin connecting pivoted members, said replacement brake pivot pin being of the same over-all dimensions as the original pin and having a cylindrical peripheral recess upon the peripheral surface of the pin and extending throughout the wearing surface of the pin, said recess being of a depth of about ten one-thousandths of an inch, a filler of non-magnetic electrically conductive material of uniform thickness intimately bonded to the pin in said recess for reducing galling tendencies due to magnetism, said pin including the filler having a smooth continuous cylindrical surface.

2. In an electrically operated brake mechanism for elevators, a pair of members subject to electro-magnetic forces and of magnetically permeable material, a pivot pin connecting said pair of members together and journaling the same for relative pivotal movement, said pivot pin comprising a pin of ferrous material and of uniform diameter and having a cylindrical peripheral recess upon the peripheral surface of the pin and extending throughout that portion of the length of the pin which is journaled in said members, a filler of non-magnetic metallic bearing material intimately bonded to the pin in said recess and intercepting the path of magnetic flux from said members to said pin.

3. The combination of claim 2 wherein said filler has an exterior cylindrical periphery which is smoothly continuous with that of the pin.

4. The combination of claim 2 wherein said filler has an exterior cylindrical periphery which is smoothly continuous with that of the pin, and wherein said filler is of a uniform thickness of abount ten one-thousandths of an inch.

OSCAR W. MAHLKE.

REFERENCES CITED

The following references are of record in the file of this patent:

UNITED STATES PATENTS

| Number | Name | Date |
|---|---|---|
| 483,806 | Hull | Oct. 4, 1892 |

FOREIGN PATENTS

| Number | Country | Date |
|---|---|---|
| 29,442 | Great Britain | 1906 |
| 104,275 | Australia | June 30, 1938 |
| 504,456 | Great Britain | Apr. 26, 1939 |